United States Patent
Li et al.

(10) Patent No.: US 12,328,668 B2
(45) Date of Patent: Jun. 10, 2025

(54) CELL RESELECTION METHOD AND DEVICE BASED ON NETWORK SLICE INFORMATION

(71) Applicant: GUANGDONG OPPO MOBILE TELECOMMUNICATIONS CORP., LTD., Dongguan (CN)

(72) Inventors: Haitao Li, Dongguan (CN); Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 473 days.

(21) Appl. No.: 17/865,187

(22) Filed: Jul. 14, 2022

(65) Prior Publication Data
US 2022/0353772 A1   Nov. 3, 2022

Related U.S. Application Data
(63) Continuation of application No. PCT/CN2020/073035, filed on Jan. 19, 2020.

(51) Int. Cl.
*H04W 48/20* (2009.01)
(52) U.S. Cl.
CPC .................. *H04W 48/20* (2013.01)
(58) Field of Classification Search
None
See application file for complete search history.

(56) References Cited

U.S. PATENT DOCUMENTS

| | | | | |
|---|---|---|---|---|
| 2018/0324602 A1* | 11/2018 | Griot | ............... | H04W 48/20 |
| 2022/0400421 A1* | 12/2022 | Hong | ............... | H04W 48/20 |
| 2022/0408328 A1* | 12/2022 | Adjakple | .......... | H04W 36/0061 |
| 2023/0037553 A1* | 2/2023 | Shih | ............... | H04W 36/13 |

FOREIGN PATENT DOCUMENTS

| | | |
|---|---|---|
| CN | 106851589 A | 6/2017 |
| CN | 106982458 A | 7/2017 |
| EP | 3567926 A1 | 11/2019 |
| EP | 3589064 A1 | 1/2020 |
| EP | 3627863 A1 | 3/2020 |
| EP | 4084527 A1 | 11/2022 |
| WO | WO2018228294 A1 | 12/2018 |

(Continued)

OTHER PUBLICATIONS

Guangdong OPPO Mobile Telecommunications Corp. Ltd., EP20914041.7, Extended European Search Report, Jan. 2, 2023, 12 pgs.

(Continued)

*Primary Examiner* — Diane L Lo
(74) *Attorney, Agent, or Firm* — Morgan, Lewis & Bockius LLP (57) ABSTRACT

The present disclosure provides cell reselection method, including: a terminal device receivers network slice information supported by a neighboring cell, the network slice information comprising single network slice selection assistance information (S-NSSAI) or an S-NSSAI set; and the terminal device perform cell reselection based on the network slice information. The present disclosure also provides another cell reselection method, an electronic device and a storage medium.

19 Claims, 2 Drawing Sheets

(56) References Cited

FOREIGN PATENT DOCUMENTS

WO  WO2019/134537 A1  7/2019
WO  WO2021/142840 A1  7/2021

OTHER PUBLICATIONS

Huawei, HiSilicon, "Slice Availability for Cell (Re-)Selection", R2-1708927 (Revision of R2-1706775), 3GPP TSG-RAN WG2 #99, Berlin, Germany, Aug. 21-25, 2017, 4 pgs.

3GPP TS 38.304 V15.6.0 (Dec. 2019); Technical Specification Group Radio Access Network; NR; User Equipment (UE) procedures in Idle mode and RRC; Inactive state (Release 15)—XP051860528, 30 pgs.

Guangdong OPPO Mobile Telecommunications Corp. Ltd., International Search Report and Written Opinion, PCT/CN2020/073035, May 28, 2020, 16 pgs.

Vivo, Cell selection/reselection with network slicing, 3GPP TSG-RAN WG2 Meeting #101, R2-1802078 (Resubmission of R2-1800855) Athens, Greece, Feb. 26,-Mar. 2, 2018, 3 pgs.

* cited by examiner

CELL RESELECTION METHOD AND DEVICE BASED ON NETWORK SLICE INFORMATION

CROSS-REFERENCE TO RELATED APPLICATION

This application is a continuation application of PCT Patent Application No. PCT/CN2020/073035, entitled "CELL RESELECTION METHOD, ELECTRONIC DEVICE AND STORAGE MEDIUM", filed on Jan. 19, 2020, which is incorporated herein by reference in its entirety.

TECHNICAL FIELD

The present disclosure relates to the field of wireless communication technologies, and in particular, to a cell reselection method, an electronic device, and a storage medium.

BACKGROUND

In the related art, network slicing have been introduced at the radio access network (RAN) side, and services related to network slicing have been developed.

SUMMARY

Embodiments of the present disclosure provide a cell reselection method, an electronic device, and a storage medium.

According to a first aspect, the present disclosure provides a cell reselection method, including: receiving, by a terminal device, network slice information supported by a neighboring cell, the network slice information including single network slice selection assistance information (S-NSSAI) or an S-NSSAI set; and performing, by the terminal device, cell reselection based on the network slice information.

According to a second aspect, the present disclosure provides a cell reselection method, including: transmitting, by a network device, to a terminal device network slice information supported by a neighboring cell; wherein the network slice information includes single network slice selection assistance information (S-NSSAI) or an S-NSSAI set, and the network slice information is used for the terminal device for cell reselection.

According to a third aspect, the present disclosure provides a terminal device, including: a receiving unit, configured to receive network slice information supported by a neighboring cell, the network slice information including single network slice selection assistance information (S-NSSAI) or an S-NSSAI set; and a processing unit, configured to perform cell reselection based on the network slice information.

According to a fourth aspect, the present disclosure provides a network device, including: a transmitting unit, configured to transmit to a terminal device network slice information supported by a neighboring cell; wherein the network slice information includes single network slice selection assistance information (S-NSSAI) or an S-NSSAI set, and the network slice information is used for the terminal device for cell reselection.

According to a fifth aspect, the present disclosure provides a terminal device including a processor and a memory for storing a computer program executable on the processor, wherein, the processor is configured to implement steps of the cell reselection method performed by the above terminal device.

According to a sixth aspect, the present disclosure provides a network device including a processor and a memory for storing a computer program executable on the processor, wherein, the processor is configured to implement steps of the cell reselection method performed by the above network device.

According to a seventh aspect, the present disclosure provides a chip including a processor configured to call and execute a computer program, to implement, by a device mounted with the chip, the cell reselection method performed by the above terminal device.

According to an eighth aspect, the present disclosure provides a chip including a processor configured to call and execute a computer program, to implement, by a device mounted with the chip, the cell reselection method performed by the above network device.

According to a ninth aspect, the present disclosure provides a storage medium stored with executable program, wherein when the executable program is executed by a processor, the cell reselection method performed by the above terminal device is implemented.

According to a tenth aspect, the present disclosure provides a storage medium stored with executable program, wherein when the executable program is executed by a processor, the cell reselection method performed by the above network device is implemented.

According to an eleventh aspect, the present disclosure provides a computer program product including computer program instructions, which causes a computer to implement the cell reselection method performed by the above terminal device.

According to a twelfth aspect, the present disclosure provides a computer program product including computer program instructions, which causes a computer to implement the cell reselection method performed by the above network device.

According to a thirteenth aspect, the present disclosure provides a computer program causing a computer to implement the cell reselection method performed by the above terminal device.

According to a fourteenth aspect, the present disclosure provides a computer program causing a computer to implement the cell reselection method performed by the above network device.

DETAILED DESCRIPTION

In order to be able to understand the features and technical contents of the embodiments of the present disclosure in more detail, the implementation of the embodiments of the present disclosure will be described in detail below with reference to the accompanying drawings.

Before describing in detail the cell access method provided by the embodiment of the present disclosure, a brief description of the related technology is given first.

At present, with people's pursuit of speed, delay, high-speed mobility, energy efficiency, and the diversity and complexity of services in future life, the 3GPP international standards organization has begun to develop the 5G. The main application scenarios of 5G are: Enhanced Mobile Broadband (eMBB), Ultra Reliable Low Latency Communications (URLLC), and Massive Machine Type Communication (mMTC).

The New Radio (NR) system can also be deployed independently. In order to reduce air interface signaling, quickly restore wireless connections, and quickly restore data services, a new Radio Resource Control (RRC) state is defined, namely inactive (RRC-Inactive) state. In the idle (RRC-Idle) state, the mobility is cell reselection based on terminal equipment, the paging process is initiated by the core network (Core Network, CN), and the paging area is configured by the CN. There is no terminal device context and no RRC connection on the network device side. In the RRC-Inactive state, mobility is cell reselection based on the terminal equipment, there is a connection between CN-NR, the terminal equipment context exists on a certain network equipment, the paging process is triggered by the RAN, and the paging area based on the RAN is managed by the RAN, the network equipment can know the location of the terminal equipment based on the paging area level of the RAN. In the RRC-Connected state, there is an RRC connection, a terminal device context exists between the network device and the terminal device, and the network device knows the location of the terminal device at the specific cell level; mobility is the mobility controlled by the network device, and unicast data can be transmitted between the network device and the terminal device.

The cell reselection will be briefly introduced hereinafter.

Cell reselection refers to a process in which a terminal device in idle mode selects a best cell to provide a service signal by monitoring the signal quality of neighboring cells and the signal quality of the current cell. When the signal quality and level of the neighboring cell satisfy the S criterion and satisfy a certain reselection decision criterion, the terminal device will access the cell to camp on.

After the terminal equipment successfully camps on the cell, the terminal equipment will continue to measure the cell. The radio resource control (RRC) layer calculates the Srxlev (that is, the S criterion) according to the reference signal receiving power (RSRP) measurement result, and compares the calculated Srxlev with the intra-frequency measurement start threshold (Sintrasearch) and inter-frequency/inter-RAT measurement start threshold (Snonintrasearch), and comparison is used as the judgment condition for whether to start neighboring cell measurement.

Hereinafter, the cell reselection R criteria and candidate cell selection for RRC-idle state and RRC-inactive state will be described.

The following criteria are followed when reselection of intra-frequency cells and inter-frequency cells with the same priority:

$$Rs = Qmeas, s + Q_{hyst} - Q_{offsettemp}$$

$$Rn = Qmeas, n - Q_{offset} - Q_{offsettemp}$$

wherein the Qmeas,s is the RSRP measurement value of the serving cell, Qmeas,n is the RSRP measurement of the neighboring cell, $O_{offset}$ is the offset value, $Q_{offsettemp}$ is the temporary offset value, and $Q_{hyst}$ is the hysteresis value.

If the network device does not configure the rangeToBestCell parameter, the terminal device sorts the Rs and Rn values of the serving cell and neighboring cells, and selects the cell with the highest Rs/Rn ranking among the serving cell and multiple neighboring cells for cell reselection.

If the network device has configured the rangeToBestCell parameter, the terminal device selects the cell with the largest number of optimal beams (beam) among the highest ranked cells defined by the parameter rangeToBestCell for reselection. The optimal beam is defined by the absThresh$_{SS\text{-}BlocksConsolidation}$ threshold. If there are many cells with the largest number of optimal beams, the terminal device reselects the cell with the highest ranking.

Hereinafter, the criteria for high-priority inter-frequency cell reselection will be described.

If the system message broadcasts Thresh$_{ServingLowQ}$, when the measured value of the reference signal receiving quality (RSRQ) of a neighboring cell on the high-priority frequency point is greater than the Thresh$_{X, HighQ}$ threshold, the terminal device triggers a reselection process to the cell. Otherwise, when the RSRP measurement value of a neighboring cell on the high-priority frequency point satisfies the threshold value greater than Thresh$_{X, HighP}$, the terminal device triggers the reselection process to the cell.

Hereinafter, the criteria for low-priority inter-frequency cell reselection will be described.

If the system message broadcasts thresh$_{ServingLowQ}$, when the RSRQ measurement value of the serving cell is less than Thresh$_{Serving, LowQ}$, and the RSRQ measurement value of a neighboring cell on the low-priority frequency point is greater than the Thresh$_{X, HighQ}$ threshold value, the terminal device triggers the reselection process to the cell. Otherwise, when the RSRP measurement value of the serving cell is less than Thresh$_{Serving, LowP}$, and the RSRP measurement value of a neighboring cell on the low-priority frequency point is greater than the Thresh$_{X, HighP}$ threshold, the terminal device triggers the reselection process.

The strong demand for wireless communication in vertical industries is obvious to all. In order to meet the needs of vertical industries in terms of delay, mobility, reliability, and location accuracy, the radio access network (RAN) needs to be enhanced for supporting vertical service at the access network. One way of the enhancement for supporting vertical service at the access network is to provide lower latency, more targeting, greater flexibility and higher scalability for multiple services with different requirements based on network slicing. More specifically, RAN slicing can involve application providers in customizing the design, deployment, and operation of the RAN to better support the application provider's services. Therefore, Release 17 (Rel-17) introduces the enhancement of slicing at the access network, which specifically involves the following aspects: The study item aims to investigate enhancement on RAN support of network slicing. Detailed objectives of the study item are:

1. Study mechanisms to enable UE fast access to the cell supporting the intended slice, including [RAN2]
    a. Slice based cell reselection under network control
    b. Slice based RACH configuration or access barring
    Note: whether the existing mechanism can meet this scenario or requirement can be studied.

Network slicing in Release 15 (Rel-15) only involves the core network side. Specifically, the terminal device reports its own network slicing requirements to the network device, and the network device selects an appropriate access and mobility management function (AMF) entity according to the network slicing requirements reported by the terminal device, to establish a service session between the terminal device and the network device.

At present, the RAN side defines S-NSSAI for each network slice, and the terminal device maintains the NSSAI. The NSSAI is an S-NSSAI list, and the S-NSSAI list includes a maximum of 8 pieces of S-NSSAI.

After the introduction of network slices on the RAN side, the network slices supported by different cells may be different, and the AMF entities corresponding to different network slices may also be different. Therefore, it is necessary to assist the network device to effectively select an appropriate AMF entity, so that the network device can devices configure the network slices required by terminal device.

In the process of implementing cell reselection, the applicant found that after the terminal equipment performs cell reselection, the transmission performance of services related to network slicing will be reduced, because when the terminal device performs cell reselection according to the reference signal quality and beam in the related art, it is possible to reselect a cell that is not at an optimal network slice supported by the terminal device. Accordingly, the embodiments of the present disclosure provide a cell reselection method for cell reselection based on network slice information.

The cell reselection method provided by the embodiments of the present disclosure can be applied to various communication systems, for example: global system of mobile communication (GSM) system, code division multiple access (CDMA) system, broadband code division multiple access (WCDMA) system, general packet radio service (GPRS), long term evolution (LTE) system, LTE frequency division duplex (FDD)) system, LTE time division duplex (TDD) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UMTS), worldwide interoperability for microwave access (WiMAX) communication systems, wireless local area networks (WLAN), wireless fidelity (WiFi), next-generation communication systems or other communication systems, etc.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), and vehicle to vehicle (V2V) communication, etc., the embodiments of the present disclosure can also be applied to these communication system.

The system architecture and service scenarios described in the embodiments of the present disclosure are for the purpose of illustrating the technical solutions of the embodiments of the present disclosure more clearly, and do not constitute limitations on the technical solutions provided by the embodiments of the present disclosure. Those of ordinary skill in the art will understand that with the evolution of the architecture and the emergence of new business scenarios, the technical solutions provided in the embodiments of the present disclosure are also applicable to similar technical problems.

The network device involved in the embodiments of the present disclosure may be a common base station (such as a NodeB or eNB or gNB), a new radio controller (NR controller), a centralized network element (centralized unit), a new radio base station, a remote radio module, micro base station, relay, distributed network element (distributed unit), reception point (transmission reception point, TRP), transmission point (TP) or any other equipment. The embodiments of the present disclosure do not limit the specific technology and specific device form adopted by the network device. For the convenience of description, in all the embodiments of this disclosure, the above-mentioned apparatuses for providing wireless communication functions for terminal equipment are collectively referred to as network device.

In this embodiment of the present disclosure, the terminal device may be any terminal, for example, the terminal device may be user equipment of machine type communication. That is to say, the terminal device may also be referred to as a user equipment UE, a mobile station (MS), a mobile terminal, a terminal, etc. the terminal device may communicate with one or more core networks via one or more radio access network (RAN). For example, the terminal device can be a mobile phone (or "cellular" phone), a computer with a mobile terminal, etc., for example, the terminal device can also be a portable, pocket-sized, handheld, computer built-in or vehicle mounted mobile devices that exchange language and/or data with the radio access network. There is no specific limitation in the embodiments of the present disclosure.

In some embodiments, network equipment and terminal equipment can be deployed on land, including indoor or outdoor, handheld or vehicle-mounted; they can also be deployed on surface; and they can also be deployed on aircraft, balloons and artificial satellites in the air. The embodiments of the present disclosure do not limit the application scenarios of the network device and the terminal device.

In some embodiments, communication between a network device and a terminal device and between the terminal devices can be performed through licensed spectrum, or through unlicensed spectrum, or both through licensed spectrum and unlicensed spectrum for communications. Communication between network device and terminal device and between terminal devices can be carried out through the spectrum below 7 gigahertz (GHz), or through the frequency spectrum above 7 GHz, and can also use the frequency spectrum below 7 GHz and the frequency spectrum above 7 GHz for communication at the same time. The embodiments of the present disclosure do not limit the spectrum resources used between the network device and the terminal device.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), and vehicle to vehicle (V2V) communication, etc., the embodiments of the present disclosure can also be applied to these communication system.

Figure 1:
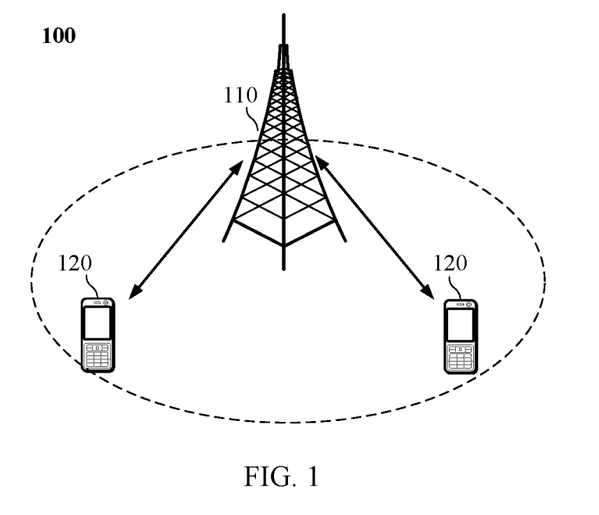
FIG. 1 is a schematic diagram of the structure of a communication system according to an embodiment of the present disclosure.

Exemplarily, the communication system 100 applied in this embodiment of the present disclosure is as shown in FIG. 1. The communication system 100 may include a network device 110, and the network device 110 may be a device that communicates with a terminal device 120 (or referred to as a communication terminal, or a terminal). The network device 110 may provide communication coverage for a particular geographic area and may communicate with terminal devices located within the coverage area. In some embodiments, the network device 110 may be a base station (Base Transceiver Station, BTS) in a GSM system or a CDMA system, a base station (NodeB, NB) in a WCDMA system, or an evolved base station in an LTE system (Evolutional Node B, eNB or eNodeB), or a wireless controller in a cloud radio access network (CRAN), or the network device can be a mobile switching center, relay station, access point, on-board equipment, Wearable devices, hubs, switches, bridges, routers, network-side devices in 5G networks, or network devices in the future evolved Public Land Mobile Network (PLMN), etc.

The communication system 100 also includes at least one terminal device 120 located within the coverage of the network device 110. "Terminal equipment" as used herein includes, but is not limited to, device configured to receive/transmit communication signal through wired lines, such as via public switched telephone networks (PSTN), digital subscriber line (DSL), digital cable, direct cable connections and/or another data connection/network; and/or through a wireless interface, e.g., cellular networks, wireless local area networks (WLAN), digital television networks such as DVB-H networks, satellite networks, AM-FM broadcast transmitter; and/or another terminal device; and/or an internet of things (IoT) device. The terminal device configured to communicate via a wireless interface may be referred to as a "wireless communication terminal", "wireless terminal" or "mobile terminal". Examples of mobile terminals include, but are not limited to, satellite or cellular telephones, the personal communications system (PCS) terminals that may combine cellular radio telephones with data processing, facsimile, and data communications capabilities; PDAs that may include radio telephones, pagers, Internet/Intranet networking access, web browser, memo pad, calendar, and/or global positioning system (GPS) receiver; and conventional laptop and/or palmtop receivers or other electronic device including radiotelephone transceivers. The terminal device may refer to an access terminal, user equipment (UE), subscriber unit, subscriber station, mobile station, mobile set, remote station, remote terminal, mobile device, user terminal, terminal, wireless communication device, user agent or user device. The access terminal may be a cellular phone, a cordless phone, a session initiation protocol (SIP) phone, a wireless local loop (WLL) station, a personal digital assistant (PDA), a handheld device with wireless communication function, computing devices or other processing devices connected to wireless modems, in-vehicle devices, wearable devices, terminal devices in 5G networks or in future evolved PLMNs, etc.

In some embodiments, device to device (D2D) communication may be performed between the terminal devices 120.

In some embodiments, the 5G system or 5G network may also be referred to as a new radio (NR) system or an NR network.

FIG. 1 exemplarily shows one network device and two terminal devices. In some embodiments, the communication system 100 may include multiple network devices and the coverage of each network device may include other numbers of terminal devices. The embodiments of the present disclosure do not limit this.

In some embodiments, the communication system 100 may further include other network entities such as a network controller and a mobility management entity, which are not limited in this embodiment of the present disclosure.

It should be understood that, in the embodiments of the present disclosure, a device having a communication function in the network/system may be referred to as a communication device. Taking the communication system 100 shown in FIG. 1 as an example, the communication device may include a network device 110 and a terminal device 120 with the communication function, and the network device 110 and the terminal device 120 may be the specific devices described above, which will not be repeated here. The communication device may also include other devices in the communication system 100, such as other network entities such as a network controller, a mobility management entity, etc., which are not limited in this embodiment of the present disclosure.

Figure 2:
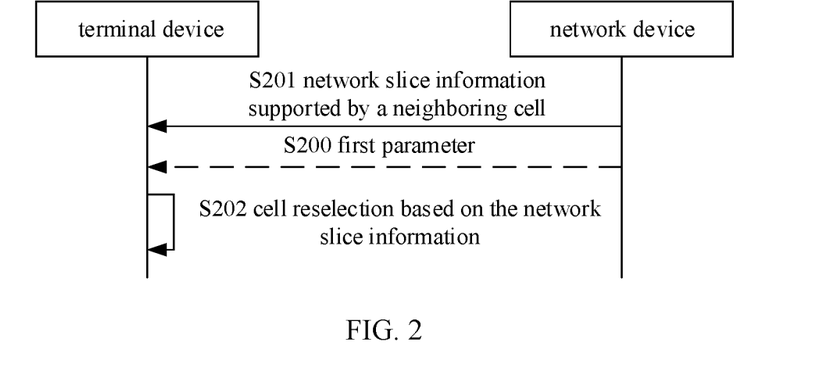
FIG. 2 is a schematic diagram of an exemplary processing flow of a cell reselection method according to an embodiment of the present disclosure.

As shown in FIG. 2, an exemplary processing flow of the cell reselection method provided by the embodiment of the present disclosure includes the following steps.

Step S201, the terminal device receives the network slice information supported by the neighboring cell.

In some embodiments, the network slice information may include S-NSSAI, or a S-NSSAI set. In the case that the network slice information includes S-NSSAI, the number of S-NSSAI may be one or more; in the case that the number of S-NSSAI is multiple, the multiple S-NSSAI may be presented in the form of a list. In the case where the network slice information includes an S-NSSAI set, one S-NSSAI set may include more than two pieces of S-NSSAI; two or more pieces of S-NSSAI included in one set are the S-NSSAI supported by the serving cells at the same time and/or in the same network connection, or more than two pieces of S-NSSAI included in one set correspond to the same AMF entity. The number of the S-NSSAI set may be one or more.

In some embodiments, the network slice information supported by the neighboring cell may be sent by the network device to the terminal device through a system broadcast message of the serving cell. For example, the network slice information supported by the serving cell is carried in the SIB message (SIB3 or other SIB messages).

Step S202, the terminal device performs cell reselection based on the network slice information.

It should be noted that the terminal device described in the embodiments of the present disclosure is a terminal device supporting network slicing.

Hereinafter, the process of performing cell reselection by the terminal device in the cases that the network slice information includes S-NSSAI, and the network slice information includes a S-NSSAI set are described.

Embodiment One

The network slice information includes S-NSSAI, and the terminal device performs cell reselection based on S-NSSAI supported by neighboring cells and S-NSSAI supported by the terminal device.

In a specific implementation, when at least two neighboring cells satisfy the first reselection criterion, the terminal device determines that the neighboring cell with the largest number of S-NSSAI supported by the terminal device among the S-NSSAI supported by the at least two neighboring cells as a candidate cell for cell reselection.

For example, the S-NSSAI supported by neighboring cell 1 is S-NSSAI-1, S-NSSAI-2, S-NSSAI-3 and S-NSSAI-4; the S-NSSAI supported by neighboring cell 2 is S-NSSAI-1, S-NSSAI-2, S-NSSAI-3 and S-NSSAI-4; the S-NSSAI supported by neighboring cell 3 is S-NSSAI-1, S-NSSAI-2 and S-NSSAI-3. The S-NSSAI supported by the terminal device is S-NSSAI-1, S-NSSAI-2, S-NSSAI-3 and S-NSSAI-4; then the terminal device selects neighboring cell 1 and neighboring cell 2 as candidate cells for cell reselection.

In the case where the number of the candidate cell is one, the candidate cell is a target cell for cell reselection. In the case where the number of the candidate cells is greater than one, the terminal device determines that the cell with the largest cell reference signal reception parameter among the candidate cells is the target cell for cell reselection. The cell reference signal reception parameter may be the RSRP of the cell and/or the RSRQ of the cell.

For the above example, the terminal device determines that the candidate cells for cell reselection are neighboring cell 1 and neighboring cell 2, and the terminal device further compares the reference signal reception parameter of neighboring cell 1 and the reference signal reception parameter of neighboring cell 2. Taking the RSRP of the cell as the cell reference signal reception parameter as an example, if the RSRP value of the neighboring cell 1 is greater than the RSRP value of the neighboring cell 2, the terminal device determines that the neighboring cell 1 is the target cell for cell reselection.

In the embodiment of the present disclosure, for high-priority frequency points, the first reselection criterion may include: the value of the reference signal reception parameter of the neighboring cell is greater than the first threshold value, e.g., the PSRQ value of the neighboring cell is greater than $Thresh_{X,\ HighQ}$, or the RSRP value of the neighboring cell is greater than $Thresh_{X,\ HighP}$. For low-priority frequency points, the first reselection criterion may include: the value of the reference signal reception parameter of the serving cell is smaller than the second threshold, and the value of the reference signal reception parameter of the neighboring cell is larger than the third threshold, e.g., the PSRQ value of the serving cell is less than $Thresh_{ServingLowQ}$, and the RSRQ value of the neighboring cell is greater than $Thresh_{X,\ HighQ}$, or the PSRP value of the serving cell is less than $Thresh_{ServingLowP}$, and the RSRP value of the neighboring cell is greater than $Thresh_{X,\ HighP}$.

In the embodiment of the present disclosure, the terminal device selects the neighboring cell with the largest number of S-NSSAI supported by the terminal device among the S-NSSAI supported by the neighboring cells for cell reselection. After the cell reselection is successful, when the terminal device initiates a network slicing-related service request, it can improve the probability of the network device receiving the service request, and improve the performance of service transmission and user experience.

Embodiment Two

The network slice information includes an S-NSSAI set, and the terminal device performs cell reselection based on the S-NSSAI set supported by the neighboring cell and the S-NSSAI supported by the terminal device.

In a specific implementation, when at least two neighboring cells satisfy the first reselection criterion, the terminal device determines that the neighboring cell having the S-NSSAI set with the largest number of S-NSSAI supported by the terminal device among the S-NSSAI sets supported by the at least two neighboring cells as a candidate cell for cell reselection.

For example, the list of S-NSSAI supported by the terminal device is: S-NSSAI-1, S-NSSAI-2, S-NSSAI-3 and S-NSSAI-4; the list of S-NSSAI set supported by neighboring cell 1 is: {S-NSSAI-1, S-NSSAI-2, S-NSSAI-3} and {S-NSSAI-2, S-NSSAI-3, S-NSSAI5}; the list of S-NSSAI set supported by neighboring cell 2 is: {S-NSSAI-2, S-NSSAI-5} and {S-NSSAI-1, S-NSSAI-4}.

Because an S-NSSAI set supported by the neighboring cell 1 includes a maximum of 3 pieces of S-NSSAI supported by the terminal equipment, namely {S-NSSAI-1, S-NSSAI-2, S-NSSAI-3}, while the S-NSSAI set supported by neighboring cell 2 includes a maximum of 2 pieces of S-NSSAI supported by the terminal device, namely {S-NSSAI-1, S-NSSAI-4}, then the terminal device will take the neighboring cell 1 as the target cell for cell reselection.

In this embodiment of the present disclosure, In the case where the number of the candidate cell is one, the candidate cell is a target cell for cell reselection. In the case where the number of the candidate cells is greater than one, the terminal device determines that the cell with the largest cell reference signal reception parameter among the candidate cells is the target cell for cell reselection. The cell reference signal reception parameter may be the RSRP of the cell and/or the RSRQ of the cell.

In the embodiment of the present disclosure, the specific implementation process of the terminal device determining the cell with the largest cell reference signal reception parameter in the candidate cell as the target cell for cell reselection, is the same as specific implementation process of the terminal device determining the cell with the largest cell reference signal reception parameter in the candidate cell as the target cell for cell reselection in the above-mentioned first embodiment, which is not repeated here. In this embodiment of the present disclosure, the description for the first reselection criterion is the same as the description for the first reselection criterion in the foregoing embodiment, and details are not repeated here.

In the embodiment of the present disclosure, the terminal device selects the neighboring cell having the S-NSSAI set with the largest number of S-NSSAI supported by the terminal device among the S-NSSAI sets supported by the neighboring cells for cell reselection. After the cell reselection is successful, when the terminal device initiates a network slicing-related service request, it can improve the probability of the network device receiving the service request, and improve the performance of service transmission and user experience.

Embodiment Three

The network slice information includes S-NSSAI and the cell reselection method may further include:

Step S200, the terminal device receives a first parameter transmitted from the network device.

In some embodiments, the first parameter is used to represent a quantity range of intersections between the S-NSSAI supported by the terminal device and the S-NSSAI supported by the neighboring cell for cell reselection. The first parameter may be represented by rangeToMostSliceCell.

In some embodiments, the first parameter may be sent by the network device to the terminal device through a system broadcast message of the serving cell. For example, the network slice information supported by the serving cell is carried in the SIB message (SIB3 or other SIB messages). The first parameter and the network slice information supported by the neighboring cell may be carried in the same system broadcast message, or may be carried in different system broadcast messages.

In a scenario where the terminal device receives the first parameter sent by the network device, the terminal device may perform cell reselection based on the S-NSSAI supported by the neighboring cell, the S-NSSAI supported by the terminal device, and the first parameter.

In a specific implementation, when at least two neighboring cells satisfy the second reselection criterion, the terminal device determines a first neighboring cell with the largest number of S-NSSAI supported by the terminal device among the S-NSSAI supported by the at least two neighboring cells, and the terminal device determines the neighboring cell having a difference between the number of S-NSSAI supported by the terminal device among the S-NSSAI supported by the neighboring cell and the number of S-NSSAI supported by the terminal device among the S-NSSAI supported by the first neighboring cell smaller than the first parameter as a candidate cell for cell reselection.

For example, the first neighboring cell with the largest number of S-NSSAI supported by the terminal device among the S-NSSAI supported by the at least two neighboring cells includes 5 pieces of S-NSSAI supported by the terminal device, and the value of the first parameter is 2, then the terminal device determines that the neighboring cell with more than 3 pieces of S-NSSAI supported by the terminal device among the S-NSSAI supported by the neighboring cells as the candidate cell for cell reselection.

In this embodiment of the present disclosure, In the case where the number of the candidate cell is one, the candidate cell is a target cell for cell reselection. In the case where the number of the candidate cells is greater than one, the terminal device determines that the cell with the largest cell reference signal reception parameter in the candidate cells is the target cell for cell reselection; or the terminal device determines that the neighboring cell with the largest number of S-NSSAI supported by the terminal device among the candidate cells as the target cell for cell reselection. The cell reference signal reception parameter may be the RSRP of the cell and/or the RSRQ of the cell.

In the embodiment of the present disclosure, the specific implementation process of the terminal device determining the cell with the largest cell reference signal reception parameter in the candidate cell as the target cell for cell reselection, is the same as specific implementation process of the terminal device determining the cell with the largest cell reference signal reception parameter in the candidate cell as the target cell for cell reselection in the above-mentioned first embodiment, which is not repeated here.

In the embodiment of the present disclosure, the second reselection criterion is the S criterion. Therefore, the third embodiment of the present disclosure is applicable to the reselection of cells of the same frequency or the reselection of cells of the same priority.

Embodiment Four

The network slice information includes S-NSSAI, and the terminal device performs cell reselection based on S-NSSAI supported by neighboring cells, S-NSSAI supported by the terminal device, and rangeToBestCell parameter.

In a specific implementation, when at least two neighboring cells satisfy the second reselection criterion, the terminal device determines a second neighboring cell with the largest number of S-NSSAI supported by the terminal device among the S-NSSAI supported by the at least two neighboring cells. In the case that the number of the second neighboring cell is one, the second neighboring cell is the target cell for cell reselection; or, in the case that the number of the second neighboring cells is greater than one, the terminal device determines a candidate cell for cell reselection among the second neighboring cells based on the rangeToBestCell parameter. In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

In this embodiment, the process for the terminal device to determine the candidate cell for cell reselection among the second neighboring cell based on the rangeToBestCell parameter is the same as that in the related art, and details are not repeated here.

In the embodiment of the present disclosure, the second reselection criterion is the S criterion. Therefore, the fourth embodiment of the present disclosure is applicable to the reselection of cells of the same frequency or the reselection of cells of the same priority.

Embodiment Five

The network slice information includes S-NSSAI and the cell reselection method may further include:

Step S200, the terminal device receives a first parameter transmitted from the network device.

In some embodiments, the first parameter is used to represent a quantity range of intersections between the S-NSSAI supported by the terminal device and the S-NSSAI supported by the neighboring cell for cell reselection. The first parameter may be represented by rangeToMostSliceCell.

In some embodiments, the first parameter may be sent by the network device to the terminal device through a system broadcast message of the serving cell. For example, the network slice information supported by the serving cell is carried in the SIB message (SIB3 or other SIB messages). The first parameter and the network slice information supported by the neighboring cell may be carried in the same system broadcast message, or may be carried in different system broadcast messages.

In a scenario where the terminal device receives the first parameter sent by the network device, the terminal device may perform cell reselection based on the S-NSSAI supported by the neighboring cell, the S-NSSAI supported by the terminal device, the first parameter and the rangeToBestCell parameter.

In some embodiments, in the case that at least two neighboring cells satisfy the second reselection criterion, the terminal device determines a third neighboring cell with the largest number of S-NSSAI supported by the terminal device among the S-NSSAI supported by the at least two neighboring cells, and the terminal device determines a neighboring cell having a difference between the number of S-NSSAI supported by the terminal device among the S-NSSAI supported by the neighboring cell and the number of S-NSSAI supported by the terminal device among the S-NSSAI supported by the third neighboring cell smaller than the first parameter as a fourth neighboring cell. In the case where the number of the fourth neighboring cell is one, the fourth neighboring cell is the target cell for cell reselection; or, in the case that the number of the fourth neighboring cells is greater than one, the terminal device determines a candidate cell for cell reselection among the fourth neighboring cells based on the rangeToBestCell parameter.

For example, the third neighboring cell with the largest number of S-NSSAI supported by the terminal device among the S-NSSAI supported by the at least two neighboring cells includes 5 pieces of S-NSSAI supported by the terminal device, and the value of the first parameter is 2, then the terminal device determines that the neighboring cell with more than 3 pieces of S-NSSAI supported by the terminal device among the S-NSSAI supported by the neighboring cells as the candidate cell for cell reselection. For example, the candidate cell for cell reselection includes a neighboring cell 3 having 3 pieces of S-NSSAI supported by the terminal device, a neighboring cell 4 having 4 pieces of S-NSSAI supported by the terminal device, and a neighboring cell 5 (i.e., the third neighboring cell) including 5 pieces of S-NSSAI supported by the terminal device. The terminal device further determines the target cell for cell reselection from the neighboring cell 3, the neighboring cell 4 and the neighboring cell 5 according to the rangeToBestCell parameter.

In the case that the number of the candidate cell is one, the terminal device determines that the candidate cell is the target cell for the terminal device to perform cell reselection. In the case that the number of the candidate cells is greater than one, the terminal device determines that the cell with the largest number of optimal beam reference signal reception parameters among the candidate cells is the target cell for cell reselection; wherein the beam reference signal reception parameter includes beam RSRP and/or beam RSRQ.

In some other embodiments, in the case that at least two neighboring cells satisfy the second reselection criterion, the terminal device determines a fifth neighboring cell based on the rangeToBestCell parameter, and the terminal device determines from the fifth neighboring cell a sixth neighboring cell with the largest number of S-NSSAI supported by the terminal device among the S-NSSAI supported by the neighboring cell.

In the case that the number of the sixth neighboring cell is one, the sixth neighboring cell is the target cell for cell reselection; or, in the case that the number of the sixth neighboring cells is greater than one, the terminal device determines from the fifth neighboring cell, the neighboring cell having a difference between the number of S-NSSAI supported by the terminal device among the S-NSSAI supported by the neighboring cell and the number of S-NSSAI supported by the terminal device among the S-NSSAI supported by the sixth neighboring cell smaller than the first parameter as the candidate cell for cell reselection.

For example, the S-NSSAI supported by the neighboring cell includes a maximum of 5 pieces of S-NSSAI supported by the terminal device, and the value of the first parameter is 2, then the terminal device determines that the neighboring cell with more than 3 pieces of S-NSSAI supported by the terminal device among the S-NSSAI supported by the neighboring cells as the candidate cell for cell reselection.

In the case that the number of the candidate cells is one, the terminal device determines that the candidate cell is the target cell for the terminal device to perform cell reselection. In the case that the number of the candidate cells is greater than one, the terminal device determines that the cell with the largest number of optimal beam reference signal reception parameters among the candidate cells is the target cell for cell reselection; wherein the beam reference signal reception parameter includes beam RSRP and/or beam RSRQ.

In still some embodiments, in the case that at least two neighboring cells satisfy the second reselection criterion, the terminal device determines a third neighboring cell with the largest number of S-NSSAI supported by the terminal device among the S-NSSAI supported by the at least two neighboring cells, determines a seventh neighboring cell from the at least two neighboring cells according to the first parameter and the third neighboring cell, determines an eighth neighboring cell from the at least two neighboring cells according to the rangeToBestCell parameter, and determines a cell corresponding to an intersection of the seventh neighboring cell and the eighth neighboring cell as a candidate cell for cell reselection.

In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

In the embodiment of the present disclosure, the process of determining the seventh neighboring cell by the terminal device from the at least two neighboring cells based on the first parameter and the third neighboring cell, is the same as the process of the terminal device performing cell reselection based on the S-NSSAI supported by the neighboring cell, the S-NSSAI supported by the terminal device and the first parameter in the third embodiment above, which will not repeated here.

In the fifth embodiment of the present disclosure, the second reselection criterion is the S criterion. Therefore, the fifth embodiment of the present disclosure is applicable to the reselection of cells of the same frequency or the reselection of cells of the same priority.

Embodiment Six

The network slice information includes the S-NSSAI set, and the terminal device performs cell reselection based on the S-NSSAI set supported by the neighboring cell, the S-NSSAI supported by the terminal device, and a rangeToBestCell parameter.

In a specific implementation, when at least two neighboring cells satisfy the second reselection criterion, the terminal device determines a ninth neighboring cell having the S-NSSAI set with the largest number of S-NSSAI supported by the terminal device among the S-NSSAI sets supported by the at least two neighboring cells.

For example, the S-NSSAI set supported by the neighboring cell 6 in the at least two neighboring cells includes 3 S-NSSAI supported by the terminal device; the S-NSSAI set supported by the neighboring cell 7 in the at least two neighboring cells includes 3 S-NSSAI supported by the terminal device; and the NSSAI set supported by the neighboring cell 8 in the at least two neighboring cells includes 2 S-NSSAI supported by the terminal device. Then the terminal device determines that the neighboring cell 6 and the neighboring cell 7 are the ninth neighboring cells.

In the case that the number of the ninth neighboring cells is one, the ninth neighboring cell is the target cell for cell reselection; or, in the case that the number of the ninth neighboring cells is greater than one, the terminal device determines the candidate cell for cell reselection from the ninth neighboring cell based on the rangeToBestCell parameter.

In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

Here, the process for the terminal device to determine a candidate cell for cell reselection from the ninth neighboring cell based on the rangeToBestCell parameter is the same as that in the related art, and details are not repeated here.

In the embodiment of the present disclosure, the second reselection criterion is the S criterion. Therefore, the sixth embodiment of the present disclosure is applicable to the reselection of cells of the same frequency or the reselection of cells of the same priority.

Embodiment Seven

The network slice information includes the S-NSSAI set and the cell reselection method may further include:

Step S200, the terminal device receives a first parameter transmitted from the network device.

In some embodiments, the first parameter is used to represent a quantity range of intersections between the S-NSSAI supported by the terminal device and the S-NSSAI supported by the neighboring cell for cell reselection. The first parameter may be represented by rangeToMostSliceCell.

In some embodiments, the first parameter may be sent by the network device to the terminal device through a system broadcast message of the serving cell. For example, the network slice information supported by the serving cell is carried in the SIB message (SIB3 or other SIB messages). The first parameter and the network slice information supported by the neighboring cell may be carried in the same system broadcast message, or may be carried in different system broadcast messages.

In a scenario where the terminal device receives the first parameter sent by the network device, the terminal device may perform cell reselection based on the S-NSSAI set supported by the neighboring cell, the S-NSSAI supported by the terminal device, the first parameter and the rangeToBestCell parameter.

In some implementations, when at least two neighboring cells satisfy the second reselection criterion, the terminal device determines a tenth neighboring cell having the S-NSSAI set with the largest number of S-NSSAI supported by the terminal device among the S-NSSAI sets supported by the at least two neighboring cells, and determines an eleventh neighboring cell from the at least two neighboring cells according to the first parameter and the tenth neighboring cell. In the case that the number of the eleventh neighboring cell is one, the eleventh neighboring cell is the target cell for cell reselection; or, in the case that the number of the eleventh neighboring cells is greater than one, the terminal device determines a candidate cell for cell reselection from the eleventh neighboring cell based on the rangeToBestCell parameter.

In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

The determining, by the terminal device, the eleventh neighboring cell among the at least two neighboring cells based on the first parameter and the tenth neighboring cell, may include: the terminal device determining the neighboring cell having a difference between the number of S-NSSAI supported by the terminal device included in the S-NSSAI set supported by the neighboring cell and the number of S-NSSAI included in the S-NSSAI set with the largest number of S-NSSAI supported by the terminal device among the S-NSSAI set supported by the tenth neighboring cell smaller than the first parameter as the eleventh neighboring cell.

For example, if the S-NSSAI set 1 supported by the tenth neighboring cell includes 2 S-NSSAI supported by the terminal device, and the S-NSSAI set 2 supported by the tenth neighboring cell includes 3 S-NSSAI supported by the terminal device, it is determined that the number of S-NSSAI included in the S-NSSAI set with the largest number of S-NSSAI supported by the terminal device among the S-NSSAI set supported by the tenth neighboring cell is 3. If the value of the first parameter is 1, the terminal device determines that the neighboring cell having the S-NSSAI set with the number of S-NSSAI supported by the terminal device among the S-NSSAI set supported by the neighboring cell greater than 2 as the eleventh neighboring cell.

In some other embodiments, in the case that at least two neighboring cells satisfy the second reselection criterion, the terminal device determines a twelfth neighboring cell according to the rangeToBestCell parameter, and determines from the twelfth neighboring cell a thirteenth neighboring cell having the S-NSSAI set with the largest number of S-NSSAI supported by the terminal device among the S-NSSAI set supported by the neighboring cells. In the case that the number of the thirteenth neighboring cell is one, the thirteenth neighboring cell is the target cell for cell reselection; or, in the case that the number of the thirteenth neighboring cells is greater than one, the terminal device determines a candidate cell for cell reselection from the twelfth neighboring cell based on the first parameter and the thirteenth neighboring cell.

In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

In this embodiment, the terminal device determining the candidate cell for cell reselection from the twelfth neighboring cell based on the first parameter and the thirteenth neighboring cell may include:

determining, by the terminal device, the neighboring cell from the twelfth neighboring cell having a difference between the number of S-NSSAI supported by the terminal device included in the S-NSSAI set supported by the neighboring cell and the number of S-NSSAI included in the S-NSSAI set with the largest number of S-NSSAI supported by the terminal device among the S-NSSAI set supported by the thirteenth neighboring cell smaller than the first parameter as the candidate cell for cell reselection.

In this embodiment of the present disclosure, the process of determining the twelfth neighboring cell by the terminal device based on the rangeToBestCell parameter is the same as that in the related art, and details are not repeated here.

In this embodiment of the present disclosure, the detailed processing process for the terminal device to determine the candidate cell for cell reselection from the twelfth neighboring cell based on the first parameter and the thirteenth neighboring cell, is the same as the detailed processing process for the terminal device to determine the eleventh neighboring cell from the at least two neighboring cell according to the first parameter and the tenth neighboring cell in some above exemplary embodiments, which will not described in detail here.

In still some embodiments, in the case that at least two neighboring cells satisfy the second reselection criterion, the terminal device determines a fourteenth neighboring cell having the S-NSSAI set with the largest number of S-NSSAI supported by the terminal device among the S-NSSAI set supported by the at least two neighboring cells, determines a fifteenth neighboring cell from the at least two neighboring cells according to the first parameter and the fourteenth neighboring cell, determines a sixteenth neighboring cell from the at least two neighboring cells according to the rangeToBestCell parameter, and determines a cell corresponding to an intersection of the fifteenth neighboring cell and the sixteenth neighboring cell as a candidate cell for cell reselection.

In the case that the number of the candidate cells is greater than one, the terminal device determines that the cell with the largest number of optimal beam reference signal reception parameters among the candidate cells is the target cell for cell reselection. The beam reference signal receiving parameter includes: beam RSRP and/or beam RSRQ.

In this embodiment of the present disclosure, the processing process for the terminal device to determine the fifteenth neighboring cell from the at least two neighboring cells based on the first parameter and the fourteenth neighboring cell, is the same as the processing process for the terminal device to perform cell reselection based on the S-NSSAI supported by the neighboring cell, the S-NSSAI supported by the terminal device, and the first parameter, which is not repeated here.

In the embodiment of the present disclosure, the second reselection criterion is the S criterion. Therefore, the seventh embodiment of the present disclosure is applicable to the reselection of cells of the same frequency or the reselection of cells of the same priority.

In this embodiment of the present disclosure, the network device sends the first parameter to the terminal device, so that the terminal device can perform cell reselection based on the first parameter. The terminal device performs cell reselection based on multiple aspects such as network slice, cell signal quality, number of optimal beams, and the like, such that the network device may provide service to the terminal device with the best possible cell signal quality, the most possible optimal beams, and the most possible network slices, thereby improving the transmission performance of the network slicing-related service, and improving the user experience.

It should be understood that, in various embodiments of the present disclosure, the size of the sequence numbers of the above-mentioned processes does not mean the order of execution, and the execution order of each process should be determined by its functions and internal logic, and should not constitute any limitation on the implementation process of the embodiments of the present disclosure.

Figure 3:
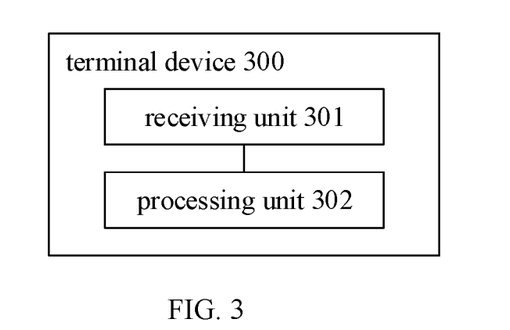
FIG. 3 is a schematic diagram of the structure of a terminal device according to an embodiment of the present disclosure.

In order to implement the above cell reselection method, an embodiment of the present disclosure provides a terminal device. An exemplary structural schematic diagram of the terminal device 300, as shown in FIG. 3, includes:

A receiving unit 301, configured to receive network slice information supported by neighboring cells, where the network slice information includes S-NSSAI or an S-NSSAI set; and A processing unit 302, configured to perform cell reselection based on the network slice information.

In some embodiments, when the network slice information includes the S-NSSAI, the processing unit 302 is configured to: perform cell reselection based on the S-NSSAI supported by the neighboring cell and the S-NSSAI supported by the terminal device.

In some embodiments, the processing unit 302 is configured to: in a case where at least two neighboring cells satisfy a first reselection criterion, determine the neighboring cell with the largest number of S-NSSAI supported by the terminal device among the S-NSSAI supported by the at least two neighboring cells as a candidate cell for cell reselection.

In some embodiments, when the network slice information includes the S-NSSAI set, the processing unit 302 is configured to: perform cell reselection based on the S-NSSAI set supported by the neighboring cell and the S-NSSAI supported by the terminal device.

In some embodiments, the processing unit 302 is configured to: in a case where at least two neighboring cells satisfy a first reselection criterion, determine the neighboring cell having the S-NSSAI set with the largest number of S-NSSAI supported by the terminal device among the S-NSSAI sets supported by the at least two neighboring cells as a candidate cell for cell reselection.

In some embodiments, the S-NSSAI set includes the S-NSSAI supported by the neighboring cells at a same time and/or in a same network connection.

In some embodiments, the first reselection criterion includes: a value of a reference signal reception parameter of the neighboring cell being greater than a first threshold; or the value of the reference signal reception parameter of a serving cell being smaller than a second threshold, and the value of the reference signal reception parameter of the neighboring cell being greater than a third threshold.

In some embodiments, the receiving unit 301 is further configured to receive a first parameter, wherein the first parameter is used to represent a quantity range of intersections between the S-NSSAI supported by the terminal device and the S-NSSAI supported by the neighboring cell for cell reselection.

In some embodiments, when the network slice information includes the S-NSSAI, the processing unit 302 is configured to: perform cell reselection based on the S-NSSAI supported by the neighboring cell, the S-NSSAI supported by the terminal device, and the first parameter.

In some embodiments, the processing unit 302 is configured to: in a case where at least two neighboring cells satisfy a second reselection criterion, determine a first neighboring cell with the largest number of S-NSSAI supported by the terminal device among the S-NSSAI supported by the at least two neighboring cells; and determine the neighboring cell having a difference between the number of S-NSSAI supported by the terminal device among the S-NSSAI supported by the neighboring cell and the number of S-NSSAI supported by the terminal device among the S-NSSAI supported by the first neighboring cell smaller than the first parameter as a candidate cell for cell reselection.

In some embodiments, the processing unit 302 is configured to: when more than one candidate cells are determined, determine a cell with largest cell reference signal reception parameter among the candidate cells as a target cell for cell reselection; or when one candidate cell is determined, determine the candidate cell as the target cell for cell reselection.

In some embodiments, the cell reference signal reception parameter includes: reference signal received power (RSRP) of the cell and/or reference signal received quality (RSRQ) of the cell.

In some embodiments, the processing unit 302 is configured to determine, when more than one candidate cells are determined, a cell with the largest number of S-NSSAI supported by the terminal device among the S-NSSAI supported by the candidate cells as a target cell for cell reselection.

In some embodiments, when the network slice information includes the S-NSSAI, the processing unit 302 is configured to: perform cell reselection based on the S-NSSAI supported by the neighboring cell, the S-NSSAI supported by the terminal device, and a rangeToBestCell parameter.

In some embodiments, the processing unit 302 is configured to: in a case where at least two neighboring cells satisfy a second reselection criterion, determine a second neighboring cell with the largest number of S-NSSAI supported by the terminal device among the S-NSSAI supported by the at least two neighboring cells.

In some embodiments, the processing unit 302 is configured to: when one second neighboring cell is determined, determine the second neighboring cell as a target cell for cell reselection; or when more than one second neighboring cell are determined, determine a candidate cell for cell reselection from the second neighboring cells according to the rangeToBestCell parameter.

In some embodiments, the processing unit 302 is configured to determine, wherein when more than one candidate cells are determined, a cell with the largest number of optimal beam reference signal reception parameters among the candidate cells as the target cell for cell reselection.

In some embodiments, when the network slice information includes the S-NSSAI, the processing unit 302 is configured to: perform cell reselection based on the S-NSSAI supported by the neighboring cell, the S-NSSAI supported by the terminal device, a first parameter, and a rangeToBestCell parameter, wherein the first parameter is used to represent a quantity range of intersections between the S-NSSAI supported by the terminal device and the S-NSSAI supported by a target neighboring cell for cell reselection.

In some embodiments, the processing unit 302 is configured to: in a case where at least two neighboring cells satisfy a second reselection criterion, determine a third neighboring cell with the largest number of S-NSSAI supported by the terminal device among the S-NSSAI supported by the at least two neighboring cells; and determine a fourth neighboring cell from the at least two neighboring cells according to the first parameter and the third neighboring cell.

In some embodiments, the processing unit 302 is configured to: when one fourth neighboring cell is determined, determine the fourth neighboring cell as a target cell for cell reselection; or when more than one fourth neighboring cells are determined, determine a candidate cell for cell reselection from the fourth neighboring cells according to the rangeToBestCell parameter.

In some embodiments, the processing unit 302 is configured to: determine the neighboring cell having a difference between the number of S-NSSAI supported by the terminal device among the S-NSSAI supported by the neighboring cell and the number of S-NSSAI supported by the terminal device among the S-NSSAI supported by the third neighboring cell smaller than the first parameter as the fourth neighboring cell.

In some embodiments, the processing unit 302 is configured to: in a case where at least two neighboring cells satisfy a second reselection criterion, determine a fifth neighboring cell according to the rangeToBestCell parameter; and determine, from the fifth neighboring cell, a sixth neighboring cell with the largest number of S-NSSAI supported by the terminal device among the S-NSSAI supported by the neighboring cells.

In some embodiments, the processing unit 302 is configured to: when one sixth neighboring cell is determined, determine the sixth neighboring cell as a target cell for cell reselection; or when more than one sixth neighboring cells are determined, determine a candidate cell for cell reselection from the fifth neighboring cell according to the first parameter and the sixth neighboring cells.

In some embodiments, the processing unit 302 is configured to: determine, from the fifth neighboring cell, the neighboring cell having a difference between the number of S-NSSAI supported by the terminal device among the S-NSSAI supported by the neighboring cell and the number of S-NSSAI supported by the terminal device among the S-NSSAI supported by the sixth neighboring cell smaller than the first parameter as the candidate cell for cell reselection.

In some embodiments, the processing unit 302 is configured to: in a case where at least two neighboring cells satisfy a second reselection criterion, determine a third neighboring cell with the largest number of S-NSSAI supported by the terminal device among the S-NSSAI supported by the at least two neighboring cells; determine a seventh neighboring cell from the at least two neighboring cells according to the first parameter and the third neighboring cell; determine an eighth neighboring cell from the at least two neighboring cells according to the rangeToBestCell parameter; and determine a cell corresponding to an intersection of the seventh neighboring cell and the eighth neighboring cell as a candidate cell for cell reselection.

In some embodiments, when the network slice information includes the S-NSSAI set, the processing unit 302 is configured to: perform cell reselection based on the S-NSSAI set supported by the neighboring cell, the S-NSSAI supported by the terminal device, and a rangeToBestCell parameter.

In some embodiments, the processing unit 302 is configured to: in a case where at least two neighboring cells satisfy a second reselection criterion, determine a ninth neighboring cell having the S-NSSAI set with the largest number of S-NSSAI supported by the terminal device among the S-NSSAI sets supported by the at least two neighboring cells.

In some embodiments, the processing unit 302 is configured to: when one ninth neighboring cell is determined, determine the ninth neighboring cell as a target cell for cell reselection; or when more than one ninth neighboring cell are determined, determine a candidate cell for cell reselection from the ninth neighboring cells according to the rangeToBestCell parameter.

In some embodiments, the processing unit 302 is configured to determine, when more than one candidate cells are determined, a cell with the largest number of optimal beam reference signal reception parameters among the candidate cells as the target cell for cell reselection.

In some embodiments, when the network slice information includes the S-NSSAI set, the processing unit 302 is configured to: perform cell reselection based on the S-NSSAI set supported by the neighboring cell, the S-NSSAI supported by the terminal device, a first parameter, and a rangeToBestCell parameter, wherein the first parameter is used to represent a quantity range of intersections between the S-NSSAI supported by the terminal device and the S-NSSAI supported by a target neighboring cell for cell reselection.

In some embodiments, the processing unit 302 is configured to: in a case where at least two neighboring cells satisfy a second reselection criterion, determine a tenth neighboring cell having the S-NSSAI set with the largest number of S-NSSAI supported by the terminal device among the S-NSSAI sets supported by the at least two neighboring cells; and determine an eleventh neighboring cell from the at least two neighboring cells according to the first parameter and the tenth neighboring cell.

In some embodiments, the processing unit 302 is configured to: when one eleventh neighboring cell is determined, determine the eleventh neighboring cell as a target cell for cell reselection; or when more than one eleventh neighboring cells are determined, determine a candidate cell for cell reselection from the eleventh neighboring cells according to the rangeToBestCell parameter.

In some embodiments, the processing unit 302 is configured to: determine the neighboring cell having a difference between the number of S-NSSAI supported by the terminal device included in the S-NSSAI set supported by the neighboring cell and the number of S-NSSAI included in the S-NSSAI set with the largest number of S-NSSAI supported by the terminal device among the S-NSSAI set supported by the tenth neighboring cell smaller than the first parameter as the eleventh neighboring cell.

In some embodiments, the processing unit 302 is configured to: in a case where at least two neighboring cells satisfy a second reselection criterion, determine a twelfth neighboring cell according to the rangeToBestCell parameter; and determine, from the twelfth neighboring cell, a thirteenth neighboring cell having the S-NSSAI set with the largest number of S-NSSAI supported by the terminal device among the S-NSSAI set supported by the neighboring cells.

In some embodiments, the processing unit 302 is configured to: when one thirteenth neighboring cell is determined, determine the thirteenth neighboring cell as a target cell for cell reselection; or when more than one thirteenth neighboring cells are determined, determine a candidate cell for cell reselection from the twelfth neighboring cell according to the first parameter and the thirteenth neighboring cells.

In some embodiments, the processing unit 302 is configured to: determine the neighboring cell from the twelfth neighboring cell having a difference between the number of S-NSSAI supported by the terminal device included in the S-NSSAI set supported by the neighboring cell and the number of S-NSSAI included in the S-NSSAI set with the largest number of S-NSSAI supported by the terminal device among the S-NSSAI set supported by the thirteenth neighboring cell smaller than the first parameter as the candidate cell for cell reselection.

In some embodiments, the processing unit 302 is configured to: in a case where at least two neighboring cells satisfy a second reselection criterion, determine a fourteenth neighboring cell having the S-NSSAI set with the largest number of S-NSSAI supported by the terminal device among the S-NSSAI set supported by the at least two neighboring cells; determine a fifteenth neighboring cell from the at least two neighboring cells according to the first parameter and the fourteenth neighboring cell; determine a sixteenth neighboring cell from the at least two neighboring cells according to the rangeToBestCell parameter; and determine a cell corresponding to an intersection of the fifteenth neighboring cell and the sixteenth neighboring cell as a candidate cell for cell reselection.

In some embodiments, the processing unit 302 is configured to: determine, when more than one candidate cells are determined, a cell with the largest number of optimal beam reference signal reception parameters among the candidate cells is determined by the terminal device as the target cell for cell reselection.

In some embodiments, the cell reference signal reception parameter includes: reference signal received power (RSRP) of the cell and/or reference signal received quality (RSRQ) of the cell.

In some embodiments, the second reselection criterion includes an S criterion.

Figure 4:
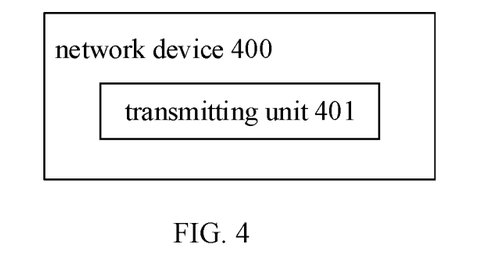
FIG. 4 is a schematic diagram of the structure of a source network device according to an embodiment of the present disclosure.

In order to implement the above cell reselection method, an embodiment of the present disclosure provides a network device. An exemplary structural schematic diagram of the network device 400, as shown in FIG. 4, includes:

a transmitting unit 401, configured to transmit to a terminal device network slice information supported by the cell;

wherein the network slice information includes single network slice selection assistance information (S-NSSAI) or an S-NSSAI set, and the network slice information is used for the terminal device for cell reselection.

In some embodiments, the transmitting unit 401 is further configured to transmit to the terminal device a first parameter, wherein the first parameter is used to represent a quantity range of intersections between the S-NSSAI supported by the terminal device and the S-NSSAI supported by the neighboring cell for cell reselection.

In some embodiments, the S-NSSAI set includes the S-NSSAI supported by the neighboring cells at a same time and/or in a same network connection.

Embodiments of the present disclosure further provides a terminal device including a processor and a memory for storing a computer program executable on the processor, wherein, the processor is configured to implement steps of the cell reselection method performed by the above terminal device.

Embodiments of the present disclosure further provides a network device including a processor and a memory for storing a computer program executable on the processor, wherein, the processor is configured to implement steps of the cell reselection method performed by the above network device.

Embodiments of the present disclosure further provides a chip including a processor configured to call and execute a computer program, to implement, by a device mounted with the chip, the cell reselection method performed by the above terminal device.

Embodiments of the present disclosure further provides a chip including a processor configured to call and execute a computer program, to implement, by a device mounted with the chip, the cell reselection method performed by the above network device.

Embodiments of the present disclosure further provides storage medium stored with executable program, wherein when the executable program is executed by a processor, the cell reselection method performed by the above terminal device is implemented.

Embodiments of the present disclosure further provides a storage medium stored with executable program, wherein when the executable program is executed by a processor, the cell reselection method performed by the above network device is implemented.

Embodiments of the present disclosure further provides a computer program product including computer program instructions, which causes a computer to implement the cell reselection method performed by the above terminal device.

Embodiments of the present disclosure further provides a computer program product including computer program instructions, which causes a computer to implement the cell reselection method performed by the above network device.

Embodiments of the present disclosure further provides a computer program causing a computer to implement the cell reselection method performed by the above terminal device.

Embodiments of the present disclosure further provides a computer program causing a computer to implement the cell reselection method performed by the above network device.

Figure 5:
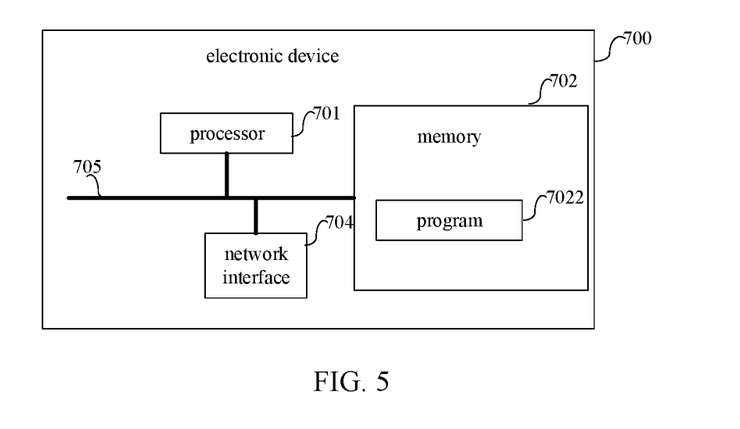
FIG. 5 is a schematic structural diagram of a hardware structure of an electronic device according to an embodiment of the present disclosure.

FIG. 5 is a schematic diagram of a hardware structure of an electronic device (terminal device or network device) according to an embodiment of the present disclosure. The electronic device 700 includes: at least one processor 701, a memory 702 and at least one network interface 704. The various components in electronic device 700 are coupled together by bus system 705. It can be understood that the bus system 705 is used to implement the connection communication between these components. In addition to a data bus, the bus system 705 also includes a power bus, a control bus and a status signal bus. However, for clarity of illustration, the various buses are labeled as bus system 705 in FIG. 5.

It will be appreciated that memory 702 may be volatile memory or non-volatile memory, and may include both volatile and non-volatile memories. The non-volatile memory may be ROM, programmable read-only memory (PROM), erasable programmable read-only memory (EPROM), electrically erasable programmable read-only memory (EEPROM), ferromagnetic random access memory (FRAM), flash memory, magnetic surface memory, optical disc, or compact disc read-only memory (CD-ROM), wherein magnetic surface memory can be disk memory or tape memory. The volatile memory may be random access memory (RAM), which is used as an external cache memory. By way of example and not limitation, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), direct Rambus random access memory (DRRAM). The memory 702 described in the embodiments of the present disclosure is intended to include, but not limited to, these and any other suitable types of memory.

The memory 702 in this embodiment of the present disclosure is used to store various types of data to support the operation of the electronic device 700. Examples of such data include: any computer program used to operate on electronic device 700, such as application program 7022. The program for implementing the method of the embodiment of the present disclosure may be included in the application program 7022.

The methods disclosed in the above embodiments of the present disclosure may be applied to the processor 701 or implemented by the processor 701. The processor 701 may be an integrated circuit chip with signal processing capability. In the implementation process, each step of the above-mentioned method can be completed by an integrated logic circuit of hardware in the processor 701 or an instruction in the form of software. The above-mentioned processor 701 may be a general-purpose processor, a digital signal processor (DSP), or other programmable logic devices, discrete gate or transistor logic devices, discrete hardware components, and the like. The processor 701 may implement or execute the methods, steps, and logical block diagrams disclosed in the embodiments of this disclosure. A general-purpose processor may be a microprocessor or any conventional processor or the like. The steps of the method disclosed in the embodiments of the present disclosure can be directly embodied as being executed by a hardware decoding processor, or executed by a combination of hardware and software modules in the decoding processor. The software module may be located in a storage medium, and the storage medium is located in the memory 702, and the processor 701 reads the information in the memory 702, and completes the steps of the foregoing method in combination with its hardware.

In an exemplary embodiment, the electronic device 700 may be implemented by one or more application specific integrated circuit (ASIC), DSP, programmable logic device (PLD), complex programmable logic device (CPLD), FPGA, general-purpose processor, controller, MCU, MPU, or other electronic component implementation for performing the above method.

Embodiments of the present disclosure further provide a storage medium for storing a computer program.

In some embodiments, the storage medium can be applied to the terminal device in the embodiment of the present disclosure, and the computer program enables the computer to execute the corresponding processes in each method executed by the terminal device in the embodiment of the present disclosure, which is not repeated here for brevity.

In some embodiments, the storage medium can be applied to the network device in the embodiment of the present disclosure, and the computer program enables the computer to execute the corresponding processes in each method executed by the network device in the embodiment of the present disclosure, which is not repeated here for brevity.

The present disclosure is described with reference to flowchart illustrations and/or block diagrams of methods, apparatus (systems), and computer program products according to embodiments of the present disclosure. It will be understood that each process and/or block in the flowchart illustrations and/or block diagrams, and combinations of processes and/or blocks in the flowchart illustrations and/or block diagrams, can be implemented by computer program instructions. These computer program instructions may be provided to the processor of a general purpose computer, dedicated computer, embedded processor or other programmable data processing device to produce a machine such that the instructions executed by the processor of the computer or other programmable data processing device produce a means for implementing the functions specified in one process or multiple processes in the flowchart and/or one block or multiple blocks in the block diagram.

These computer program instructions may also be stored in a computer-readable memory capable of directing a computer or other programmable data processing apparatus to function in a particular manner, such that the instructions stored in the computer-readable memory result in an article of manufacture including instruction means, wherein the instruction means implements the functions specified in one process or multiple processes in the flowchart and/or one block or multiple blocks in the block diagram.

These computer program instructions can also be loaded on a computer or other programmable data processing device to cause a series of operational steps to be performed on the computer or other programmable device to produce a computer-implemented process such that the instructions provide steps for implementing the functions specified in one process or multiple processes in the flowchart and/or one block or multiple blocks in the block diagram.

It should be understood that the terms "system" and "network" in this disclosure are often used interchangeably herein. The term "and/or" in this disclosure is only an association relationship to describe associated objects, indicating that there can be three kinds of relationships, for example, A and/or B, it can mean the three cases of only A, both A and B, and only B. In addition, the character "/" in this disclosure generally indicates that the related objects have an "or" relationship.

The above descriptions are only preferred embodiments of the present disclosure, and are not intended to limit the protection scope of the present disclosure. Any modifications, equivalent replacements and improvements made within the spirit and principles of the present disclosure shall be included in the within the scope of protection of this disclosure.

What is claimed is:

1. A cell reselection method, comprising:
receiving, by a terminal device, network slice information supported by a neighboring cell, the network slice information comprising single network slice selection assistance information (S-NSSAI) or an S-NSSAI set; and
performing, by the terminal device, cell reselection based on the network slice information,
wherein when the network slice information comprises the S-NSSAI, the performing, by the terminal device, cell reselection based on the network slice information comprises: performing, by the terminal device, cell reselection based on the S-NSSAI supported by the neighboring cell, the S-NSSAI supported by the terminal device, and a rangeToBestCell parameter; or
wherein when the network slice information comprises the S-NSSAI set, the performing, by the terminal device, cell reselection based on the network slice information comprises: performing, by the terminal device, cell reselection based on the S-NSSAI set supported by the neighboring cell, the S-NSSAI supported by the terminal device, and a rangeToBestCell parameter.

2. The method according to claim 1, wherein when the network slice information comprises the S-NSSAI, the performing, by the terminal device, cell reselection based on the network slice information comprises:
performing, by the terminal device, cell reselection based on the S-NSSAI supported by the neighboring cell and the S-NSSAI supported by the terminal device.

3. The method according to claim 2, wherein the performing, by the terminal device, cell reselection based on the S-NSSAI supported by the neighboring cell and the S-NSSAI supported by the terminal device comprises:
in a case where at least two neighboring cells satisfy a first reselection criterion, determining, by the terminal device, the neighboring cell with a largest number of S-NSSAI supported by the terminal device among the S-NSSAI supported by the at least two neighboring cells as a candidate cell for cell reselection.

4. The method according to claim 3, wherein the first reselection criterion comprises:
a value of a reference signal reception parameter of the neighboring cell being greater than a first threshold; or
the value of the reference signal reception parameter of a serving cell being smaller than a second threshold, and the value of the reference signal reception parameter of the neighboring cell being greater than a third threshold.

5. The method according to claim 4, wherein the cell reference signal reception parameter comprises:
reference signal received power (RSRP) of the cell and/or reference signal received quality (RSRQ) of the cell.

6. The method according to claim 3, wherein:
when more than one candidate cells are determined, a cell with largest cell reference signal reception parameter among the candidate cells is determined by the terminal device as a target cell for cell reselection; or
when one candidate cell is determined, the candidate cell is the target cell for cell reselection.

7. The method according to claim 1, wherein when the network slice information comprises the S-NSSAI set, the performing, by the terminal device, cell reselection based on the network slice information comprises:
performing, by the terminal device, cell reselection based on the S-NSSAI set supported by the neighboring cell and the S-NSSAI supported by the terminal device.

8. The method according to claim 7, wherein the performing, by the terminal device, cell reselection based on the S-NSSAI set supported by the neighboring cell and the S-NSSAI supported by the terminal device comprises:
in a case where at least two neighboring cells satisfy a first reselection criterion, determining, by the terminal device, the neighboring cell having the S-NSSAI set with a largest number of S-NSSAI supported by the terminal device among the S-NSSAI sets supported by the at least two neighboring cells as a candidate cell for cell reselection.

9. The method according to claim 7, wherein the S-NSSAI set comprises the S-NSSAI supported by the neighboring cells at a same time and/or in a same network connection.

10. The method according to claim 1, further comprising:
receiving, by the terminal device, a first parameter, wherein the first parameter is used to represent a quantity range of intersections between the S-NSSAI supported by the terminal device and the S-NSSAI supported by the neighboring cell for cell reselection.

11. The method according to claim 10, wherein when the network slice information comprises the S-NSSAI, the performing, by the terminal device, cell reselection based on the network slice information comprises:
performing, by the terminal device, cell reselection based on the S-NSSAI supported by the neighboring cell, the S-NSSAI supported by the terminal device, and the first parameter.

12. The method according to claim 11, wherein the performing, by the terminal device, cell reselection based on the S-NSSAI supported by the neighboring cell, the S-NSSAI supported by the terminal device, and the first parameter comprises:
in a case where at least two neighboring cells satisfy a second reselection criterion, determining, by the terminal device, a first neighboring cell with a largest number of S-NSSAI supported by the terminal device among the S-NSSAI supported by the at least two neighboring cells; and
determining, by the terminal device, a pending neighboring cell having a difference between a first number of S-NSSAI and a second number of S-NSSAI smaller than the first parameter as a candidate cell for cell reselection, wherein the first number of S-NSSAI is a number of S-NSSAI supported by the terminal device among the S-NSSAI supported by the first neighboring cell, and the second number of S-NSSAI is a number of S-NSSAI supported by the terminal device among the S-NSSAI supported by the pending neighboring cell.

13. The method according to claim 1, wherein the performing, by the terminal device, cell reselection based on the network slice information further comprises:
performing, by the terminal device, cell reselection based on the S-NSSAI supported by the neighboring cell, the S-NSSAI supported by the terminal device, a first parameter, and the rangeToBestCell parameter,
wherein the first parameter is used to represent a quantity range of intersections between the S-NSSAI supported by the terminal device and the S-NSSAI supported by a target neighboring cell for cell reselection.

14. The method according to claim 1, wherein the performing, by the terminal device, cell reselection based on the network slice information further comprises:
performing, by the terminal device, cell reselection based on the S-NSSAI set supported by the neighboring cell, the S-NSSAI supported by the terminal device, a first parameter, and the rangeToBestCell parameter,
wherein the first parameter is used to represent a quantity range of intersections between the S-NSSAI supported by the terminal device and the S-NSSAI supported by a target neighboring cell for cell reselection.

15. The method according to claim 14, wherein the performing, by the terminal device, cell reselection based on the S-NSSAI set supported by the neighboring cell, the S-NSSAI supported by the terminal device, the first parameter, and the rangeToBestCell parameter comprises:
in a case where at least two neighboring cells satisfy a second reselection criterion, determining, by the terminal device, a tenth neighboring cell having the S-NSSAI set with a largest number of S-NSSAI supported by the terminal device among the S-NSSAI sets supported by the at least two neighboring cells; and
determining an eleventh neighboring cell from the at least two neighboring cells according to the first parameter and the tenth neighboring cell.

16. The method according to claim 14, wherein the performing, by the terminal device, cell reselection based on the S-NSSAI set supported by the neighboring cell, the S-NSSAI supported by the terminal device, the first parameter, and the rangeToBestCell parameter comprises:
in a case where at least two neighboring cells satisfy a second reselection criterion, determining, by the terminal device, a twelfth neighboring cell according to the rangeToBestCell parameter; and
determining, by the terminal device from the twelfth neighboring cell, a thirteenth neighboring cell having the S-NSSAI set with a largest number of S-NSSAI supported by the terminal device among the S-NSSAI set supported by the neighboring cells.

17. The method according to claim 14, wherein the performing, by the terminal device, cell reselection based on the S-NSSAI set supported by the neighboring cell, the S-NSSAI supported by the terminal device, the first parameter, and the rangeToBestCell parameter comprises:
in a case where at least two neighboring cells satisfy a second reselection criterion, determining, by the terminal device, a fourteenth neighboring cell having the S-NSSAI set with a largest number of S-NSSAI supported by the terminal device among the S-NSSAI set supported by the at least two neighboring cells;
determining a fifteenth neighboring cell from the at least two neighboring cells according to the first parameter and the fourteenth neighboring cell;
determining a sixteenth neighboring cell from the at least two neighboring cells according to the rangeToBestCell parameter; and
determining a cell corresponding to an intersection of the fifteenth neighboring cell and the sixteenth neighboring cell as a candidate cell for cell reselection.

18. A terminal device, comprising a processor and a memory for storing a computer program executable on the processor, wherein,
the processor is configured, when executing the computer program, to:
receive network slice information supported by a neighboring cell, the network slice information comprising single network slice selection assistance information (S-NSSAI) or an S-NSSAI set; and
perform cell reselection based on the network slice information,
wherein when the network slice information comprises the S-NSSAI, the processor is further configured to: perform cell reselection based on the S-NSSAI supported by the neighboring cell, the S-NSSAI supported by the terminal device, and a rangeToBestCell parameter; or
wherein when the network slice information comprises the S-NSSAI set, the processor is further configured to: perform cell reselection based on the network slice information comprises: performing, by the terminal device, cell reselection based on the S-NSSAI set supported by the neighboring cell, the S-NSSAI supported by the terminal device, and a rangeToBestCell parameter.

19. A network device, comprising a processor and a memory for storing a computer program executable on the processor, wherein,
the processor is configured, when executing the computer program, to:
transmit to a terminal device network slice information supported by a neighboring cell;
wherein the network slice information comprises single network slice selection assistance information (S-NSSAI) or an S-NSSAI set, and the network slice information is used for the terminal device for cell reselection,
wherein when the network slice information comprises the S-NSSAI, the network slice information is used for the terminal device for performing cell reselection based on the S-NSSAI supported by the neighboring cell, the S-NSSAI supported by the terminal device, and a rangeToBestCell parameter; or
when the when the network slice information comprises the S-NSSAI set, the network slice information is used for the terminal device for performing cell reselection based on the S-NSSAI set supported by the neighboring cell, the S-NSSAI supported by the terminal device, and a rangeToBestCell parameter.

* * * * *